No. 822,442.
PATENTED JUNE 5, 1906.
H. B. GAMBLIN.
STOCK FEEDER.
APPLICATION FILED APR. 2, 1906.
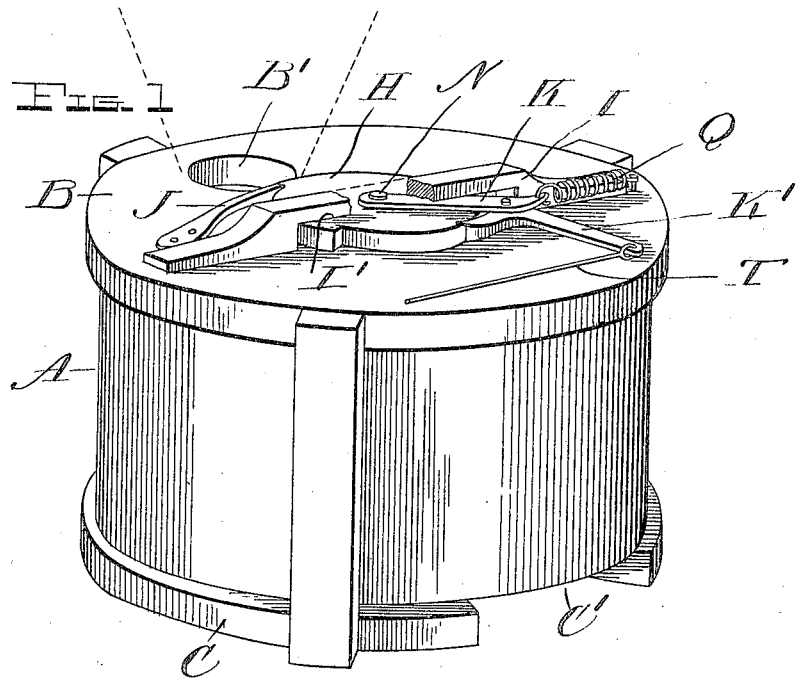
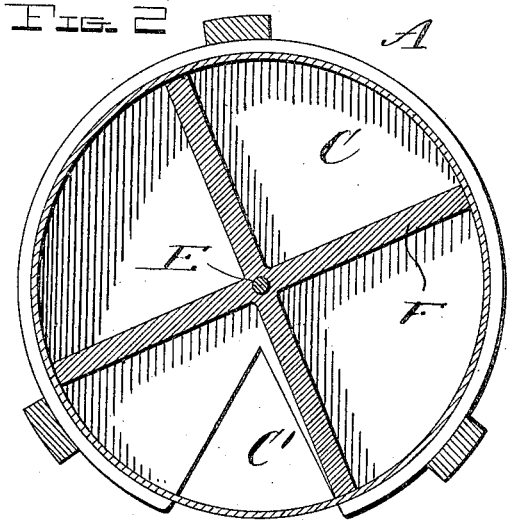
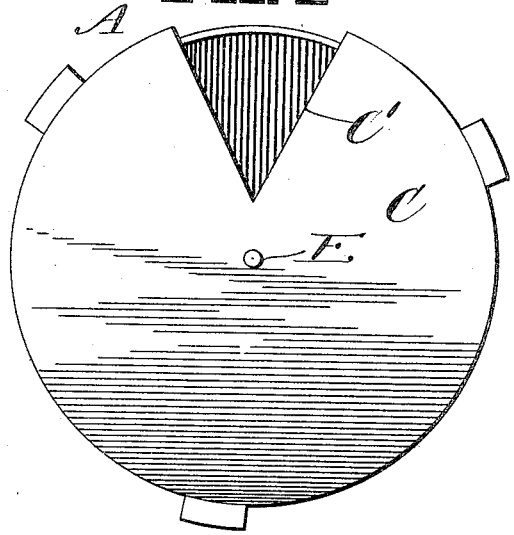
WITNESSES:
INVENTOR
Henry B. Gamblin,
BY Franklin H. Hough
Attorney

UNITED STATES PATENT OFFICE.

HENRY B. GAMBLIN, OF SALEM, MISSOURI.

STOCK-FEEDER.

No. 822,442.

Specification of Letters Patent.

Patented June 5, 1906.

Application filed April 2, 1906. Serial No. 309,518.

*To all whom it may concern:*

Be it known that I, HENRY B. GAMBLIN, a citizen of the United States, residing at Salem, in the county of Dent and State of Missouri, have invented certain new and useful Improvements in Stock-Feeders; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in automatic stock-feeding apparatus; and the object of the invention is to produce a simple and efficient apparatus whereby feed of any kind may be fed to stock by the simple pulling upon a rope or wire which may lead to any desired place, thereby affording a simple means for the purpose of manipulating the apparatus without going to the stable.

My invention consists in various details of construction and combinations and arrangements of parts, which will be hereinafter fully described and then specifically defined in the appended claims.

My invention is illustrated in the accompanying drawings, in which—

Figure 1 is a perspective view of my stock-feeding apparatus. Fig. 2 is a sectional view transversely through the same, and Fig. 3 is a bottom plan view.

Reference now being had to the details of the drawings by letter, A designates a feed-receptacle which is made preferably of cylindrical shape and has a top B with an aperture B' therein and a bottom C with an opening C', through which the feed may be fed to a trough or other receptacle.

E designates a shaft which is journaled in the top and bottom of the feed-receptacle, and F designates a winged wheel dividing the interior of the feed-receptacle into four compartments adapted to contain a certain amount of feed to be fed. The compartments formed by the wings of the wheel are filled by a feed which is allowed to pass through the opening B' from the hopper or bin.

H designates a ratchet-wheel which is fixed to the upper end of said shaft, and K is a pivotal bar mounted at one end upon the pin N and carries a pawl or level K', pivotally mounted upon the bar K, and said lever has an angled projection adapted to contact with the ratchet-teeth of said wheel, whereby the latter may be given an intermittent rotary movement. A spring Q is fastened at one end to said top and its other end to the bar K, the office of which spring is to normally hold the bar in its farthest limit in one direction after having been driven forward for the purpose of rotating the wheel.

I designates a guide member having a recess I' in the under surface thereof, which member is fastened to the top of the receptacle and serves as a means for holding the bar as it swings upon its pivot.

J designates a fixed pawl which is mounted upon the top of the receptacle and adapted to bear against the circumference of said wheel N, whereby the latter may be prevented from rotating backward.

T designates a rope or wire which is fastened to the arm of the lever pivotally mounted upon the bar K and adapted to extend to any suitable location at a distance from the stable, as within a house, whereby the apparatus may be operated without the necessity of going to the stable.

In operation, the feeder being positioned with the exit-opening in the bottom thereof over a trough or other receptacle and a supply bin or hopper positioned over the feeder, whereby a supply of feed may be fed by gravity to fill the compartments of the feed-receptacle, when it is desired to empty one of the compartments it may be done by pulling on said rope or wire, causing the pivotal lever to engage a ratchet-tooth upon the circumference of said wheel, thereby causing the wings within the feed-receptacle to push the feed over the exit-opening. After a compartment has been emptied a second pull upon the wire will bring another compartment over the opening, and the empty compartment as it comes underneath the delivery end of the hopper or bin will again fill.

From the foregoing it will be noted that the apparatus is automatic in its action, affording means for delivering feed by simply pulling upon the cord or rope, which may extend at a distance from the place where the feeder is located.

What I claim is—

1. A stock-feeding apparatus comprising a receptacle with an inlet and exit opening therein, a rotary winged wheel within the receptacle and dividing the latter into compartments, a ratchet-wheel rotating with said winged wheel, and means for operating said ratchet-wheel, as set forth.

2. A stock-feeding apparatus comprising a receptacle with an inlet and exit opening therein, a rotary winged wheel within the receptacle and dividing the latter into compartments, a ratchet-wheel rotating with said winged wheel, a pivotal bar, and a lever pivotally mounted upon said bar and adapted to engage the teeth of said ratchet-wheel, whereby an intermittent movement may be imparted to the winged wheel, as set forth.

3. A stock-feeding apparatus comprising a receptacle with an inlet and exit opening therein, a rotary winged wheel within the receptacle and dividing the latter into compartments, a ratchet-wheel rotating with said winged wheel, a pivotal bar, a lever pivotally mounted upon said bar and adapted to engage the teeth of said ratchet-wheel, whereby an intermittent movement may be imparted to the winged wheel, a guide for said bar, and means for preventing a backward rotary movement of said wheel, as set forth.

4. A stock-feeding apparatus comprising a cylindrical receptacle with an opening in the top for the reception of feed and an exit-opening in the bottom, a shaft mounted in the top and bottom of the receptacle, a winged wheel rotating with said shaft and dividing the receptacle into compartments, a ratchet-wheel rotating with said shaft, a pivotal bar mounted upon said shaft, a spring for normally holding said bar in its limit in one direction, a fixed pawl adapted to prevent a reverse movement to said wheel, an angle-lever pivotally mounted upon said bar and adapted to engage the teeth of said ratchet-wheel, and a rope or wire secured to said lever, as set forth.

In testimony whereof I hereunto affix my signature in the presence of two witnesses.

HENRY B. GAMBLIN.

Witnesses:
WILLIAM N. KELL,
JOHN H. MOSER.